United States Patent [19]

Yasuoka

[11] 4,024,890
[45] May 24, 1977

[54] ROTARY VALVE

[75] Inventor: Masahiro Yasuoka, Hirakata, Japan

[73] Assignee: Kuboto Tekko Kabushiki Kaisha, Osaka, Japan

[22] Filed: May 15, 1975

[21] Appl. No.: 577,932

[30] Foreign Application Priority Data

May 17, 1974 Japan .................. 49-55941
Oct. 7, 1974 Japan .............. 49-121459[U]

[52] U.S. Cl. ............... 137/556.3; 74/424.8 B; 251/265; 251/269; 251/292

[51] Int. Cl.² ........................ F16K 37/00

[58] Field of Search .......... 251/221, 222, 225, 264, 251/268, 269, 273, 292, 304, 308, 229; 137/556, 556.3, 556.6; 74/424.8 B

[56] References Cited

UNITED STATES PATENTS

| 803,565 | 11/1905 | Dina | 74/424.8 B |
| 1,244,630 | 10/1917 | Mitchell | 137/556.3 |
| 1,502,734 | 7/1924 | Martin | 251/221 |
| 2,373,268 | 4/1945 | Shelly | 251/229 |
| 2,538,436 | 1/1951 | Weinberg | 137/556.3 |
| 2,633,143 | 3/1953 | Simon | 251/269 |
| 2,791,129 | 5/1957 | Russell | 74/424.8 B |
| 3,064,674 | 11/1962 | Carfagna | 251/229 |
| 3,184,214 | 5/1965 | King | 251/229 |
| 3,348,567 | 10/1967 | Volpin | 251/269 |
| 3,373,969 | 3/1968 | Teitt | 251/229 |
| 3,726,151 | 4/1973 | Lemor | 74/424.8 B |

FOREIGN PATENTS OR APPLICATIONS

| 867,771 | 2/1953 | Germany | 251/264 |
| 353,556 | 7/1931 | United Kingdom | 251/269 |
| 683,387 | 11/1952 | United Kingdom | 251/264 |

Primary Examiner—Martin P. Schwadron
Assistant Examiner—G. L. Walton
Attorney, Agent, or Firm—Edwin E. Greigg

[57] ABSTRACT

Rotary valve comprising a rotatable stem having a valve disk fixed thereto and disposed within a valve case, a slidable tube and a rotatable tubular member each positioned coaxially with the stem and connected to the valve case, first screw-thread means for holding the stem and the slidable tube in screw-thread engagement with each other, and second screw-thread means for holding the slidable tube and the tubular member in screw-thread engagement with each other, the first screw-thread means having a larger lead angle than the second screw-thread means, so that the rotation of the tubular member rotates the stem of the valve disk.

4 Claims, 4 Drawing Figures

ROTARY VALVE

BACKGROUND OF THE INVENTION

Generally known valve operating means for use in rotary valves include, for example, worm gearing which is employed to prevent the rotation of the valve stem and the resulting displacement of the valve disk due to the fluid pressure acting on the valve disk or the negative pressure produced downstream of the valve disk when the valve disk controls a flow of fluid. The valve disk which is subject to fluid pressure is made operable with a small force by the worm gearing, utilizing its reduction ratio.

In order to render the valve disk operable with a small force, the worm gearing must have a large reduction ratio, which entails the necessity of greatly increasing the diameter of the worm wheel and consequently enlarges the valve itself. Moreover, because the worm wheel meshes with the worm having an axis at right angles to the axis of rotation of the worm wheel, the rotary shaft portion of the worm projects from the worm wheel. Thus the worm gearing has the disadvantage of making the valve construction still larger.

Especially when the rotary valve is mounted on an underground pipe with the rotatable stem of its valve disk positioned in a perpendicular direction, the operating worm which is at right angles to the axis of the rotatable stem is in a horizontal position. Accordingly, if it is attempted to drive the worm from above, there arises the need to form a fairly large vault in the ground for the operation of the valve. Otherwise, it would become necessary to employ additional members such as bevel gears for turning the direction of operation upward and therefore to provide a large space for accommodating the bevel gears or like means. Conversely, even when the valve is mounted on an underground pipe in such a position that the axis of rotation of the valve disk is horizontal, a portion of the rotatable valve stem fixed to the valve disk must be made to project from the valve case to render the valve disk rotatable from outside, so that the projection of the stem, worm wheel and worm require a correspondingly enlarged space on the lateral side of the valve case. In either case, therefore, the worm gearing has the drawback of necessitating a considerably large underground space for operation.

In place of worm gearing, lever or link means is usable, but the lever or link structure makes the valve itself large and requires an additional space for allowing the pivotal movement of link or lever means, which leads to the need for a still larger space for operation. Such means further involves the inconvenience of being unable to automatically maintain the valve in its set position when the valve disk is subjected to a torque due to fluid pressure or the like, unless it incorporates a special lock mechanism.

SMMARY OF THE INVENTION

The present invention provides a rotary valve which is free of the conventional drawbacks, operable with a small force, compact and yet automatically lockable in its set position against a force exerted on the valve disk by the flow of fluid to be controlled.

The rotary valve of this invention comprises a valve case provided with a projection, a rotatable stem disposed in and supported by the valve case and having one end extending into the interior of the projection, the rotatable stem being capable of no other movement than rotation, a valve disk fixed to the stem, a slidable tube and a rotatable tubular member each disposed coaxially with the stem, a rotatable operating member integral with the tubular member, first screw-thread means for holding the stem and the slidable tube in screw-thread engagement with one another, and second screw-thread means for holding the slidable tube and the tubular member in screw-thread engagement with one another, the first screw-thread means having a larger lead angle than the second screw-thread means, the slidable tube being supported by the projection movably only in the direction of axis of the stem, the tubular member being supported by the projection and being capable of no other movement than rotation about the axis of the stem, so that the rotation of the tubular member rotates the stem.

Thus the slidable member is screwed, with threads having a large lead angle, on the rotatable stem fixedly provided with the valve disk and is supported by the projection so as to be movable axially of the stem, whereby the rotatable tubular member can be screwed on the slidable member and arranged coaxially with the rotatable stem.

This construction makes it possible to arrange the constituent parts coaxially with the rotatable stem to provide a rotary valve which is compact in its entirety, operable with a small force and yet automatically lockable as described above.

For use in a place where the space for installation or operation is limited, such as in an underground pipe for example, the rotary valve of this invention requires a smaller vault than conventional valves and is satisfactorily operable with a small force from above, while permitting the valve disk to be automatically and effectively maintained in its set position.

An object of this invention is to provide a rotary valve which is operable with a small force, automatically lockable in its set position and compact in its entirety.

Another object of this invention is to provide a rotary valve in which the opening degree of the valve disk is easily ascertainable when the valve is operated.

Still another object of this invention is to provide an indicator of simple structure by which the opening degree of the valve disk is ascertainable.

Other objects and advantages of this invention will be apparent from the embodiments described hereinafter.

DESCRIPTION OF THE PREFERRED EMBODIMENTS

Figure 1:
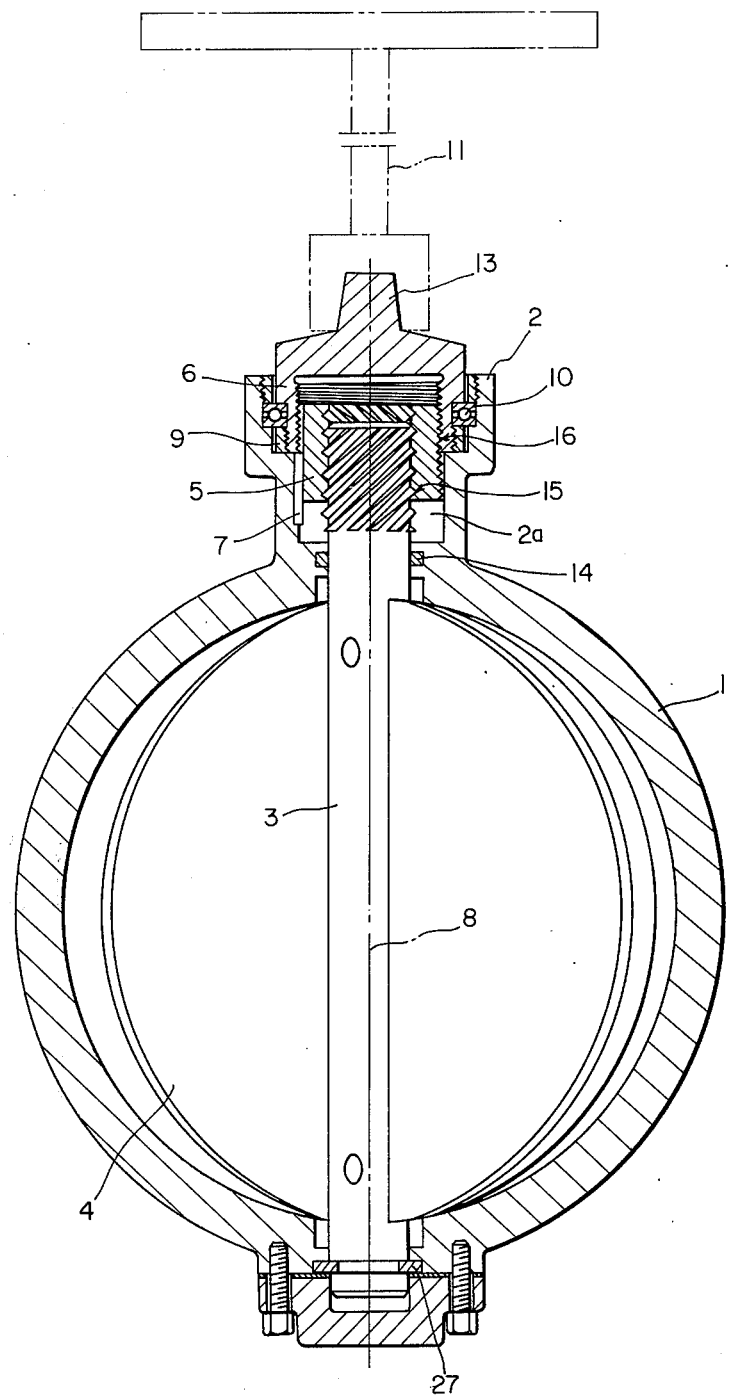
FIG. 1 is a view in vertical section showing a butterfly valve which is an example of the rotary valve of this invention.

The mode of practicing this invention will be described with reference to the preferred embodiments. FIG. 1 shows a valve case 1 installed in an unillustrated pipe. The valve case 1 is provided with a projection 2 having an approximately cylindrical internal space 2a which opens outward. The projection 2 may be integral with or removably attached to the valve case 1. A rotatable stem 3 is disposed in and supported by the valve case 1 and is fixed provided with a valve disk 4 positioned within the valve case 1. One end of the stem 3 extends into the internal space 2a of the projection 2, and the other end thereof is fixedly provided with a thrust ring 27 which engages with the valve case 1 to prevent the axial movement of the stem 3. A slidable tube 5 is directly fitted around the end of the rotatable stem 3, which end is positioned in the internal space 2a of the projection 2. The actuator means 5 is coaxial with the stem 3 at axis 8. A rotatable tubular member 6 is directly fitted around the slidable actuator means 5 and is coaxial with the stem 3 at axis 8. The portion of the member 6 which fits around the tube 5 is received in the enlarged area of the projection 2. The tubular member 6 is in the form of a cap and serves also as a top cover for the space 2a. The tube 5 is fitted around the stem 3 with first screw-thread means 15 formed on the outer peripheral surface of the stem 3 and on the inner peripheral surface of the tube 5, the first screw-thread means 15 having a large lead angle and being multithreaded. Although the first screw-thread means is an eight-thread screw in the drawing, a good effect can be produced from a range of six- to twelve-thread screws having appropriate lead angles. The rotatable tubular member 6 is fitted around the slidable tube 5 by second screw-thread means 16 formed on the outer peripheral surface of the tube 5 and on the inner peripheral surface of the rotatable tube 6, the second screw-thread means 16 having a smaller lead angle than the first means 15. The second screw-thread means may be single-threaded as shown in the drawing or multithreaded. The tube 5 is mounted in and supported by the projection 2 slidably only in the direction of axis 8 of the stem 3, with a key 7 interposed between the tube 5 and the projection 2. The tubular member 6 is mounted in the projection 2 by means of an annular collar 9 threadedly secured to the inner wall of the neck 2 and further includes one wall that abuts the upper race of member 6 and a bearing 10. A rotatable operating member 13, provided substantially at the center of the tubular member 6, is in the form of a projection which offstands axially of the stem 3.

The member 13 may be so shaped as to be operable by a handwheel or a handle 11 in engagement therewith as seen in FIG. 1, or the projection itself may have such shape that it is directly operable. Alternatively, the member 13 may be adapted for connection with the drive system of some other prime mover. A multi-part seal 14 is provided between the valve case 1 and the rotatable stem 3.

The tubular member 6, when operated by the member 13, rotates about the axis 8 of the stem 3 in engagement, through the second screw-thread means 16, with the slidable tube 5, which in turn slidingly moves in the direction of the axis 8 while being prevented by key 7 from rotation about the axis 8. The movement of the tube 5 consequently rotates the stem 3 supported in engagement with the tube 5 by the first screw-thread means 15, whereby the valve disk 4 fixed to the stem 3 is rotated therewith. Thus the flow of the fluid in the valve case 1 is controlled as desired with a small force. The valve disk 4 is retained in the set position by the first screw-thread means 15 having a large lead angle and the second screw-thread means 16 having a small lead angle, against the possible displacement even when the valve disk 4 is subjected to a load owing to the fluid.

Figure 2:
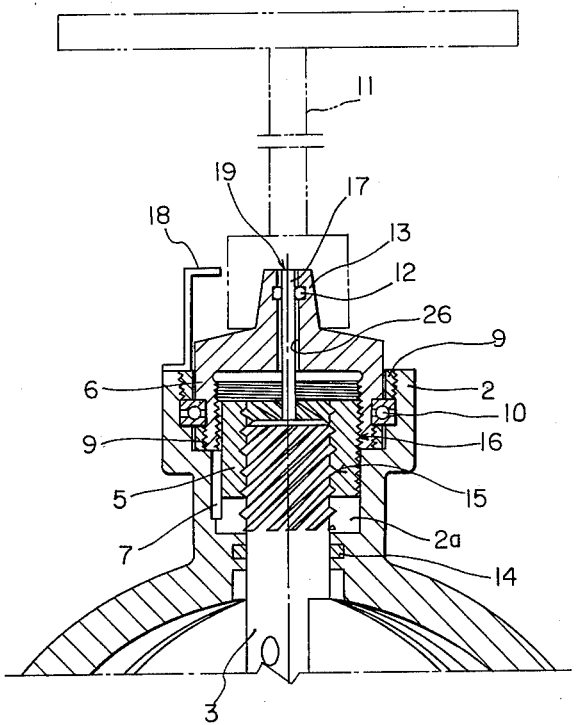
FIG. 2 is a view in vertical section showing another butterfly valve which is an improved example of the rotary valve of this invention.
Figure 3:
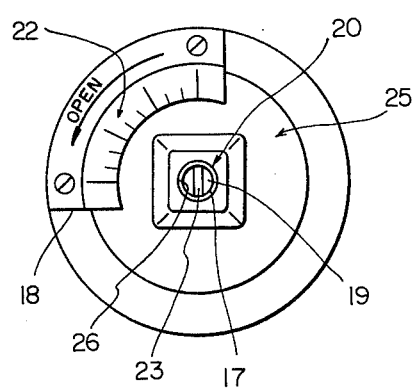
FIG. 3 is a partial plan view on an enlarged scale showing the valve of FIG. 2.
Figure 4:
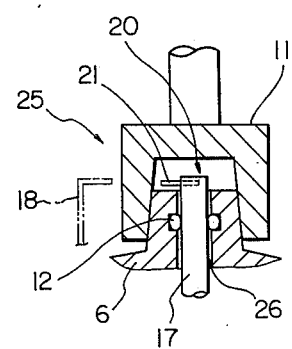
FIG. 4 is an enlarged side elevation in vertical section showing the principal part of another embodiment of opening degree indicator.

In FIGS. 2 to 4, the same parts as in FIG. 1 are referred to by like reference numerals and description thereof will not be given therefore. An indicating rod 17, extending through a bore 26 formed in the center of the tubular member 6, is rotatable relative to the member 6 with a ball bearing 12 provided between the rod 17 and the member 6. The rod 17 has one end projecting from the top of the tubular member 6 and the other end fixed to the upper end of the stem 3.

Designated at 20 is an opening degree indicator provided on the exposed upper surface 19 of the rod 17. The indicating rod 17 and the indicator 20 constitute opening degree indicating means 25. A specific simple example of the indicator 20 is in the form of a groove 23 formed in the exposed surface 19. An opening degree scale 22 is provided on a scale plate 18 extending from the projection 2. The position of the groove 23 in the rod 17 relative to the scale 22 indicates to what degree the valve disk 4 is opened. Alternatively, the indicator 20 may comprise a pointer 21 fixed to the rod 17 close to its exposed surface 19 and extending toward the scale plate 18. The pointer 21 and scale 22 make it easier to detect the degree of opening of the valve disk 4.

When the stem 3 is rotated by the foregoing procedure, the groove 23 or the pointer 21 of the indicating means 25 on the upper end of the stem 3 is displaced relative to the scale 22. By reading the scale 22 which indicates the degree of opening of the valve disk 4, it is easy to move the operating member 13 to set the valve disk 4 at the desired degree of opening. After the valve disk has been set at the desired degree, the valve is readily controllable for subsequent operation, because the opening degree is always indicated on the scale 22.

What we claim is:

1. An actuating device for a rotary slide valve in which a rotatable valve stem, disposed in a valve case so as to be immovable in axial direction and supporting a rotary valve disk, engages via a coarse thread at its upper end with a slidable member, which is guided so as to be movable in an axial direction within a hollow cylindrical valve case projection, said slidable member in turn engaging with a fine thread provided at its outer periphery with a rotary member, which is non-slidably supported by the valve case projection and rotatable by means of a hand wheel, characterized in that the hollow cylindrical internal space (2a) of the valve case projection (2) accepts, in addition to the upper end of the valve stem (3) and the slidable member (5), also the rotary member (6), which is supported therein by means of a thrust bearing (10) as well as a collar (9), said rotary member being designed as a top cover for the internal space (2a) of the valve case projection (2), surrounding in cap-like manner the tubular shaped slidable member (5), and being connected with the hand wheel (11) via an operating member (13) which is shaped to project from the center of the top side.

2. A device according to claim 1, further characterized in that the rotary member (6) as well as the operating member (13) are provided with an axial bore and rotatably accept an indicating means (25), connected to the valve stem (3), for the degree of opening of the valve disk (4) which acts in conjunction with a scale (22) disposed adjacent to the valve case projection (2).

3. A device according to claim 1, further characterized in that the indicating means (25) has a groove (23) which is provided at the exposed upper surface (19) of a rod (17) which extends in an upward direction from the valve stem.

4. A device according to claim 1, further characterized in that the indicating means (25) has a pointer (21) affixed at the exposed upper surface (19) of a rod (17) which extends in an upward direction from the valve stem (3).

* * * * *